United States Patent [19]

Arai et al.

[11] 4,033,634

[45] July 5, 1977

[54] ANTISKID CONTROL DEVICE FOR VEHICLES

[75] Inventors: Hiroshi Arai, Toyota; Takahiro Nogami, Susono; Akio Sugiura, Nagoya; Atutoshi Okamoto, Toyohashi; Koichi Toyama, Kariya, all of Japan

[73] Assignees: Nippondenso Co., Ltd, Kariya; Toyota Jidosha Kogyo Kabushiki Kaisha, Toyota, both of Japan

[22] Filed: June 18, 1975

[21] Appl. No.: 588,173

[30] Foreign Application Priority Data

June 28, 1974 Japan .............................. 49-74661

[52] U.S. Cl. .................................. 303/103; 303/20; 303/110; 303/115
[51] Int. Cl.² ............................................ B60T 8/02
[58] Field of Search ............... 188/181; 303/20, 21, 303/103, 105, 106, 110, 111, 115; 317/5; 340/53, 62

[56] References Cited

UNITED STATES PATENTS

| | | | |
|---|---|---|---|
| 3,017,145 | 1/1962 | Yarber | 303/21 BE |
| 3,863,993 | 2/1975 | Fleischer et al. | 303/21 BE |
| 3,877,758 | 4/1975 | Kuwana | 303/21 F |
| 3,883,183 | 5/1975 | Burckhardt et al. | 303/21 P |
| 3,888,550 | 6/1975 | Reinecke et al. | 303/21 P |

*Primary Examiner*—Stephen G. Kunin
*Attorney, Agent, or Firm*—Cushman, Darby & Cushman

[57] ABSTRACT

An antiskid control device for vehicles, comprising a timer circuit for producing a timing signal in synchronism with the extinction of a release signal for a skid control, apparatus for rapidly increasing the braking pressure applied to the wheel in response to said timing signal coming from the timer circuit, and correcting apparatus for increasing the braking pressure increasing rate when a large amount of friction is present between the wheel and the road surface, said antiskid control device being able to hold the fluctuation of the braking pressure within a narrow range to prevent unnecessary vibrations of the vehicle at the time of braking due to the fact that the braking pressure increasing rate is changed when the braking pressure is reapplied to the wheel, and being able to control the braking operation at all times in a manner best suited to the various road surface conditions encountered so that a skid of the vehicle is prevented from occurring and the braking distance is reduced greatly, due to the fact that the braking pressure increasing rate is adjusted in accordance with the coefficients of friction between the wheel and the road surface.

8 Claims, 10 Drawing Figures

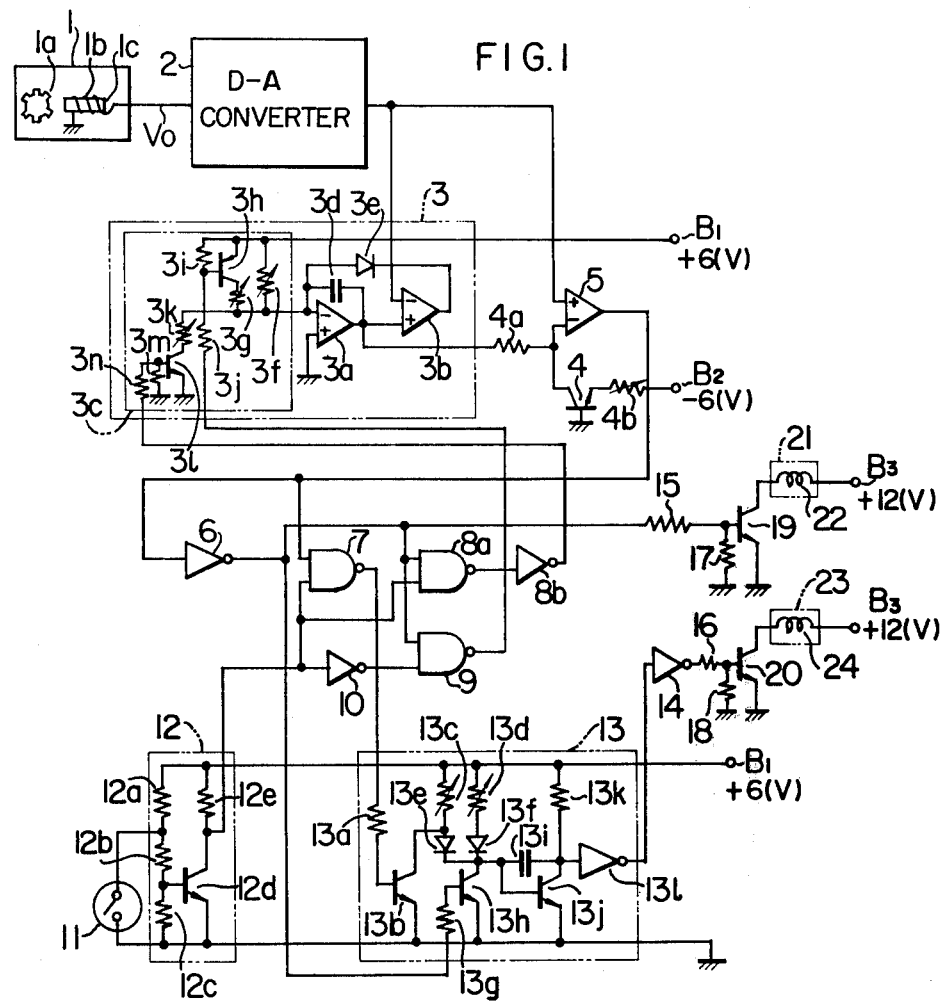
FIG.1
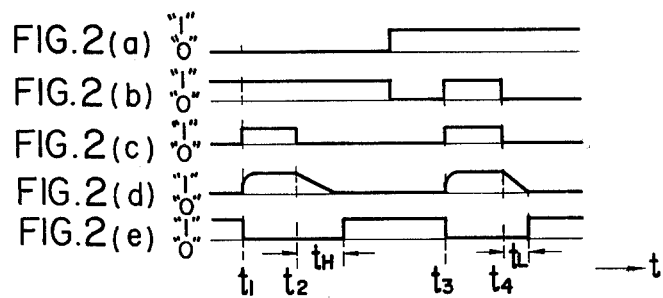
FIG.2(a)
FIG.2(b)
FIG.2(c)
FIG.2(d)
FIG.2(e)

2

ANTISKID CONTROL DEVICE FOR VEHICLES

BACKGROUND OF THE INVENTION

1. Field of the Invention

The present invention relates to an antiskid control device for vehicles, in which a skid of the wheel resulting from the locking of the wheel is prevented from occurring, the locking of the wheel taking place when a vehicle is braked upon running and the braking pressure exceeds the value matched with the coefficient of friction between the wheel and the road surface.

2. Description of the Prior Art

In the conventional antiskid control devices of this type, the vehicle body speed is detected and the wheel speed is maintained at, say, about 80 percent of the vehicle body speed to attain an instantaneous control of the braking operation. One of these control devices detects the wheel speed and performs a speculative control of the braking operation for preventing the locking of wheel. That is, in order to avoid the locking of wheel, the wheel speed is momentarily memorized just before braking, there is obtained a reference speed for the imaginary vehicle body speed obtained by decreasing the memorized wheel speed according to a predetermined control pattern, and the actual wheel speed is compared with the reference speed. In addition, a certain number of different control patterns of the type described above are incorporated preliminarily in the control device, the road surface conditions are observed by a deceleration sensor (hereinaftr referred to as "G sensor"), and on the basis of the results of observation by the G sensor the braking operation is controlled speculatively at all times so that the braking pressure is increased and decreased in accordance with such factors as the changes of the coefficient of friction between the wheel and the road surface and the like. However, in the conventional control device having the above construction, although the time when the braking pressure applied to the wheel is released is adjusted in accordance with the changes in the road surface conditions, no consideration is given to the braking pressure increasing rate at the time of the reapplication of braking pressure to the wheel. Therefore, the braking pressure increasing rate is constant, with the result that the braking pressure often fluctuates within an unnecessarily wide range thereby increasing the braking distance. This constitutes a serious disadvantage.

SUMMARY OF THE INVENTION

The object of the present invention is to provide an antiskid control device for vehicles in which the above described disadvantage is eliminated.

This object has been accomplished by an antiskid control device for vehicles comprising means for detecting the locking condition of the wheel at the time of braking to produce a release signal, means for releasing the braking pressure applied to the wheel in response to the release signal coming from said detecting means, a timer circuit for producing a timing signal having a predetermined time duration in for the initial stage of the pressure-reapplication of said braking pressure in synchronism with the time of said pressure-reapplication in response to the extinction of the release signal coming from said detecting means, and means for rapidly increasing the pressure-reapplication rate of the braking pressure applied to the wheel for the initial stage of said pressure-reapplication in response to the timing signal produced in said timer circuit.

In the antiskid control device for vehicles in accordance with the present invention, the fluctuation of the braking pressure applied to the wheel due to the operation to change the braking pressure can be held within a very narrow range by changing the increasing rate of the braking pressure applied to the wheel and by adjusting the braking pressure increasing rate in accordance with the changes in the road surface conditions, and the braking pressure increasing rate is controlled to match the coefficient of friction between the wheel and the road surface so that a skid of the vehicle can be prevented from occurring and the braking distance can be reduced greatly.

BRIEF DESCRIPTION OF THE DRAWINGS

FIG. 1 is an electrical connection diagram showing an embodiment of the antiskid control device for vehicles in accordance with the present invention;

FIGS. 2(a) through 2(e) are wave form diagrams illustrating wave forms appearing at the various parts of the timer circuit to explain the operation of the timer circuit.

DETAILED DESCRIPTION OF PREFERRED EMBODIMENTS

Figure 3A:
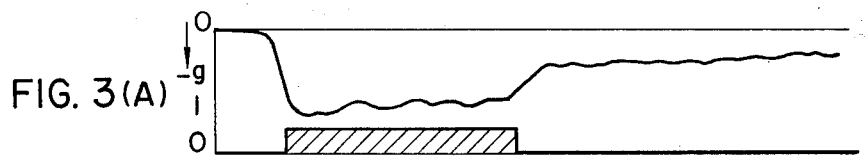
FIGS. 3A through 3D show characteristic diagrams explaining the operation of the device in accordance with the present invention.

The present invention will be explained hereinafter with reference to one embodiment thereof shown in the accompanying drawings. Referring to FIG. 1 which is an electrical connection diagram for the control device in accordance with the present invention, the numeral 1 indicates a wheel sensor for producing a pulse signal at a frequency proportional to the wheel speed, and the numeral 1a designates a rotating body which is made of a magnetic material and attached to a rotating shaft having a relation with the rotation of wheel such as the axle and the like. The rotating body 1a has at the peripheral edge thereof a plurality of projections. The numeral 1b indicates a power generating winding wound on the outer peripheral surface of a permanent magnet 1c. If the rotating body 1a is rotated, the magnetic flux passing through the power generating winding 1b is varied so that an a.c. voltage at a frequency corresponding to the wheel speed develops across the power generating winding 1b and an output signal appears at an output terminal Vo. The numeral 2 designates a D-A conversion circuit where the pulse signal coming from the wheel sensor 1 undergoes a D-A conversion to produce a d.c. voltage proportional to the wheel speed. The D-A conversion circuit 2 may be a publicly known integration circuit. The numeral 3 indicates a circuit for setting up imaginary vehicle body speeds which sets up vehicle body speed by decreasing step by step the wheel speeds measured immediately before braking in accordance with predetermined control patterns. The circuit for setting up imaginary vehicle body speeds 3 comprises an operational amplifier for integrating operations 3a, a comparator 3b, a deceleration setting circuit 3c, a condenser 3d, and a diode 3e. When the comparator 3b shows that d.c. output voltage at the output of the D-A conversion circuit 2 (hereinafter referred to as "wheel speed voltage") is increasing or constant, the condenser 3d is charged through the diode 3e, so that the wheel speed voltage is equal to the output voltage at the output of the integration circuit comprising the operational amplifier for integrating operations 3a and the condenser 3d. On the other hand, when the wheel speed is decreasing, the charging of the condenser 3d is stopped and the charge on the condenser 3d is discharged through transistors 3h and 3l and a resistance 3f, with the result that a voltage corresponding to the imaginary vehicle body speed is produced across the terminals of the condenser 3d. The deceleration setting circuit 3c comprises variable resistances 3f, 3g, and 3k, transistors 3h and 3l, and bias resistances 3i, 3j, 3m, and 3n. A first set deceleration $g_0$ is set by the variable resistance 3f, a second set deceleration $g_1$ is set by the variable resistance 3g, and a third set deceleration $g_2$ is set by the variable resistance 3k. A pattern shifting circuit which will be described later changes the control patterns successively to change the first, second, and third set decelerations $g_0$, $g_1$, and $g_2$ successively. The numeral 4a designates a resistance for producing reference speed voltages each of which is obtained by subtracting a voltage corresponding to the difference between the wheel speed and the vehicle body speed $\Delta V$ from an imaginary vehicle body speed voltage. In order to maintain said voltage corresponding to the difference between the wheel speed and the vehicle body speed $\Delta V$ constant, a constant-current circuit including a transistor 4 is formed so that a constant current flows through the resistance 4a. The value of the current flowing through the resistance 4a is determined by the value of resistance of a variable resistance 4b. The numeral 5 indicates a comparator which makes a comparison between the wheel speed voltage and the reference speed voltage (the imaginary vehicle body speed voltage — the voltage corresponding to the difference between the wheel speed and the vehicle body speed $\Delta V$). When the relationship "the wheel speed voltage < the reference speed voltage" is established, the 1 signal at the output of the comparator 5 changes to a 0 signal, and a 1 signal for releasing the braking pressure develops at the output of a NOT circuit 6. The wheel speed voltage begins to increase in response to this release signal. And when the relationship "the wheel speed voltage $\geq$ the reference speed voltage" is established, the 0 signal at the output of the comparator 5 changes to a 1 signal, and a 0 signal develops at the output of the NOT circuit 6. Thus, the braking pressure release signal is removed and a braking pressure reapplication signal is produced. As described above, the braking pressure release signal and the braking pressure reapplication signal develop at the output terminal of the NOT circuit 6 as a 1 signal and a 0 signal. The circuit for setting up imaginary vehicle body speeds 3, the transistor 4, and the comparator 5 constitute locking detecting means for producing braking pressure release signals. The symbols $B_1$ and $B_2$ respectively indicate a + 6(V) power terminal and a − 6(V) power terminal. The numerals 7, 8a, and 9 designate NAND circuits, and the numerals 8b and 10 indicate NOT circuits. The numeral 11 designates a deceleration sensor (hereinafter referred to as G sensor) which functions as correcting means for detecting the road surface conditions to increase the braking pressure increasing rate, and opens when the deceleration equals or exceeds a predetermined value, e.g., 0.5g. The numeral 12 indicates a buffer circuit which receives signals from the G sensor 11 and comprises bias resistances 12a, 12b, and 12c, a transistor 12d, and a load resistance 12e. The NAND circuits 8a and 9, the NOT circuits 8b and 10, and the buffer circuit 12 change the control patterns for the reference speeds successively in a required manner to change the first, second, and third set decelerations $g_0$, $g_1$, and $g_2$. When a braking pressure release signal is produced, a 1 signal develops at the output of the NOT circuit 6. At this time, if the vehicle body deceleration is high and the G sensor 11 is open, 1 signals develop at both of the two inputs of the NAND circuit 9 and the 1 signal at the output of the NAND circuit 9 is changed to a 0 signal, so that the transistor 3h conducts and the reference speed Vs exhibits a discharge characteristic in accord with the second set deceleration $g_1$. In contrast to the situation described above, if the vehicle body deceleration is low and the G sensor 11 is closed when the braking pressure release signal is produced, 1 signals develop at both of the two inputs of the NAND circuit 8a and the 1 signal at the output of the NAND circuit 8a is changed to a 0 signal. Since the NOT circuit 8b is producing a 1 signal, the transistor 3l conducts and the reference speed Vs exhibits a discharge characteristic in accord with the third set deceleration $g_2$. The numeral 13 designates a timer circuit which produced a timing signal in synchronism with the extinction of the braking pressure release signal, and comprises resistances 13a, 13c, 13d, 13g, and 13k, transistors 13b, 13h, and 13g, diodes 13e and 13f, a timing condenser 13i, and a NOT circuit 13l. An explanation will be given here to the operation of the timer circuit 13 with reference to FIGS. 2(a) through 2(e) which are wave form diagrams for the control device in accordance with the present invention. In FIG. 2(a) there is shown the output at the collector of the transistor 12d. FIG. 2(a) indicates that when a 0 signal is present in the related circuits, the G sensor 11 is open, i.e., the vehicle body deceleration is high, and that when a 1 signal is present in the related circuits, the G sensor 11 is closed, i.e., the vehicle body deceleration is low. FIG. 2(b) shows the wave form at the base of the transistor 13b, and FIG. 2(c) shows the output of the NOT circuit 6, i.e., the braking pressure release signal at the output of the NOT circuit 6. FIG. 2(d) shows the output at the collector of the transistor 13j, and FIG. 2(e) shows the output of the NOT circuit 13l. Assume that the vehicle body deceleration is high and the G sensor 11 is open. If a braking pressure release signal, which is the 1 signal shown by FIG. 2(c), is produced at the time $t_1$, the transistor 13h conducts and the condenser 13i is charged through the resistance 13k. And if the braking pressure release signal is extinguished at the time $t_2$, the transistor 13h cuts off and the transistor 13b conducts, so that the condenser 13i is discharged through the resistance 13d. As a result, a 0 signal is sustained at the output of the NOT circuit 13l for a first timed duration $t_H$ after the removal of the braking pressure release signal, as shown by FIG. 2(e). At the time $t_4$, the vehicle body deceleration is low, the G sensor 11 is closed, and the braking pressure release signal is extinguished. As a result, the wave form at the base of the transistor 13b, which determines the output of the NAND circuit 7, represents a 0 signal as shown by FIG. 2(b), and the transistor 13b cuts off. Thus, the discharge of the condenser 13i started at the time $t_4$ due to the combined resistance of the resistances 13c and 13d connected in parallel, and a second timed duration $t_L$ shorter than the first timed duration $t_H$ is used. The numeral 14 designates a NOT circuit, and the numerals 15 through 18 indicate resistances. The numerals 19 and 20 designate power transistors, and the numerals 21 and 23 indicate braking pressure changing means which are drive electromagnetically for changing the braking pressure applied to the wheel. The figure does not illustrate the mechanical construction of the braking pressure changing means 21 and 23, only showing their electromagnetic coils 22 and 24. When the electromagnetic coils 22 and 24 are not energized, the normal braking operation can be performed by the driver by depressing the brake pedal. The braking pressure changing means 21 is called the main modulator. When the main modulator 21 is energized, the electromagnetic force induced in the modulator drives such means as a three-way valve and a servo-mechanism, so that the braking pressure applied to the wheel is decreased forcedly, even if the driver is depressing the brake pedal. The braking pressure changing means 23 is called the sub modulator. When the sub modulator 23 is energized, the electromagnetic force induced in the modulator drives such means as a valve and selects a required one of the orifices to which a negative pressure and the atmospheric pressure are applied, with the result that the increasing rate and the decreasing rate of the braking pressure applied to the wheel can be controlled in a desired manner. The state of operation of the electromagnetic coils 22 and 24 determines the increasing rate and the decreasing rate of the braking pressure, as shown in the table below.

| | Rapid decrease of the braking pressure (F/D) | Slow decrease of the braking pressure (S/D) | Rapid increase of the braking pressure (F/B) | Slow increase of the braking pressure (S/B) |
|---|---|---|---|---|
| Electromagnetic coil 22 | ON | ON | OFF | OFF |
| Electromagnetic coil 24 | ON | OFF | ON | OFF |

The increasing rate and the decreasing rate of the braking pressure can be changed readily also by choosing a required one of the orifices in the sub modulator 23. The sub modulator 23 functions as braking pressure increasing rate changing means. The bases of the power transistors 19 and 20 which energize and deenergize the electromagnetic coils 22 and 24, are respectively connected to the output terminals of the NOT circuits 6 and 14 through the resistances 15 and 16. The electromagnetic coils 22 and 24 are connected at one end to power terminals $B_3$ (+ 12V).

Figure 3B:
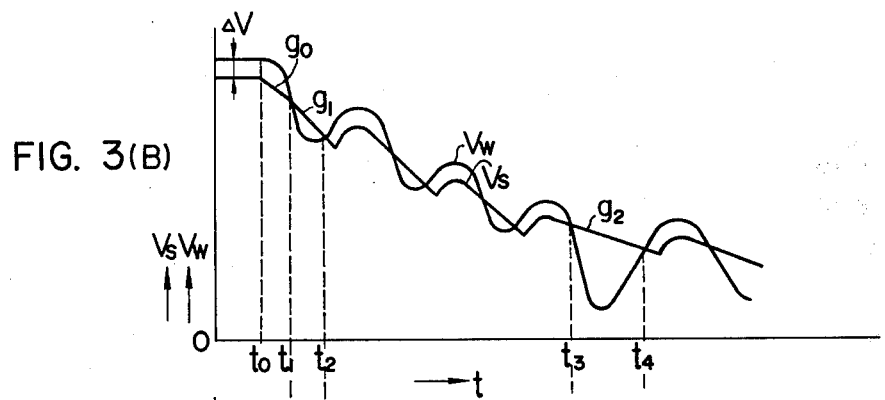
Figure 3C:
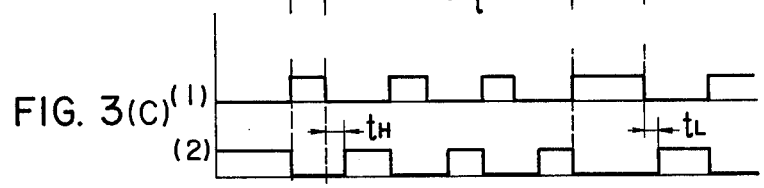
Figure 3D:

The operation of the control device in accordance with the present invention which has the construction described above, will be explained here with reference to FIGS. 3A—3D showing characteristic diagrams for said control device. FIG. 3A illustrates the vehicle body deceleration and the operation of the G sensor 11. FIG. 3B shows the change with time of the wheel speed Vw and the reference speed Vs. FIG. 3C illustrates a braking pressure release signal and a braking pressure controlling signal. FIG. 3D shows the change with time of the braking pressure applied to the wheel.

If the brake pedal is depressed at the time $t_0$, the braking pressure is applied to the wheel, and the wheel speed Vw decreases at a deceleration which is determined in accordance with the magnitude of the braking pressure. At the same time, the reference speed Vs decreases in accordance with a predetermined control pattern. As soon as the wheel speed Vw decreases at the time $t_1$ to a value less than the reference speed Vs obtained by subtracting the difference between the wheel speed and the car body speed ΔV (for instance, 3 km/H) from the imaginary vehicle body speed, the braking pressure release signal shown in signal graph (1) in FIG. 3C is produced at the output of the NOT circuit 6, and the braking pressure controlling signal illustrated in signal graph (2) in FIG. 3C is produced at the output of the timer circuit 13. The main modulator 21 and the sub modulator 23, which constitute braking pressure changing means, both are energized by the braking pressure release signal and the braking pressure controlling signal described above, and the braking pressure applied to the wheel is decreased forcedly and rapidly as shown in FIG. 3D, resulting in an increase of the wheel speed Vw. As soon as the wheel speed Vw becomes equal to the reference speed Vs at the time $t_2$, a 0 signal develops at the output of the NOT circuit 6. That is, the braking pressure release signal is extinguished and a braking pressure reapplication signal is produced, with the result that the electromagnetic coil 22 is deenergized and the braking pressure is reapplied to the wheel. When the braking pressure release signal is extinguished, the timer circuit 13 produces a braking pressure controlling signal, so that a 0 signal is sustained for a first timed duration $t_H$ (for instance 60 milli-seconds) and the electromagnetic coil 24 is kept in the energized state. As the result, the braking pressure is increased very rapidly during the first timed duration $t_H$. And when the braking pressure controlling signal is extinguished to deenergize the electromagnetic coil 24, the increasing rate of the braking pressure is stepped down and the braking pressure increases slowly until the next braking pressure release signal is produced. The first timed duration $t_H$ is determined by the timer circuit 13, and matches the state at the time $t_2$ in which the vehicle body deceleration is high. On the other hand, the control patterns for the reference speed Vs are changed successively towardd the lower speed side with the deceleration of the wheel. For example, the above control patterns are changed in accordance with a first set deceleration $g_0$ (1.0g), a second set deceleration $g_1$ (2.0g), and a third set deceleration $g_2$ (0.5g). The g above designates gravity accelerations. If the brake pedal is depressed at the time $t_0$ to apply the braking pressure to the wheel, the wheel speed Vw is decreased at a deceleration corresponding to the braking pressure, and the reference speed Vs is decreased at the first set deceleration $g_0$ determined by the resistance 3f. As soon as the wheel speed Vw decreases at the time $t_1$ to a value less than the reference speed Vs, a 0 signal develops at the output of the comparator 5 and the NOT circuit 6 produces a 1 signal which is a braking pressure release signal, so that the electromagnetic coil 22 is energized and the control pattern for the reference speed Vs is changed with a new one. This change of control pattern means that at the time $t_1$ the G sensor is open and the vehicle body deceleration is high. Therefore, a 0 signal is produced in the NAND circuit 9, with the result that the transistor 3h conducts, and the reference speed Vs is decreased at the second set deceleration $g_1$ until at the time $t_2$ the reference speed Vs becomes equal to the wheel speed Vw. At the time $t_2$ the reference speed Vs begins to change and thereafter shows values which are obtained by subtracting the difference between the wheel speed and the vehicle body speed $\Delta V$ from the wheel speeds Vw. As the wheel speed Vw decreases, the reference speed Vs changes in accordance with the control pattern used for the operation between the time $t_0$ and the time $t_2$. The operations described above are repeated, so that the braking pressure is changed and the braking is controlled with a high efficiency.

The situation arising at the time $t_3$ is that the vehicle body deceleration is low when the braking pressure release signal is produced. At the time $t_3$ the G sensor 11 is closed and a 0 signal is produced in the NAND circuit 8a, with the result that a 1 signal is produced in the NOT circuit 8b and the transistor 3l conducts. At this point, a 1 signal is present at the output of the NAND circuit 9 and the transistor 3h is being held at cut off. The reference speed Vs decreases at the third set deceleration $g_2$ determined by the resistance 3k, and a braking pressure release signal is sustained for a duration from the time $t_3$ to the time $t_4$. When the braking pressure release signal is extinguished, the transistor 13h in the timer circuit 13 cuts off, a 0 signal develops at the output of the NAND circuit 7, and the transistor 13b cuts off. Therefore, the resistances 13c and 13d connected in parallel forms a discharge path for the condenser 13i, and a braking pressure controlling signal sustains a 0 signal for a second timed duration $t_L$ (for instance 20 milli-seconds), which is shorter than the first timed duration $t_H$, to keep the sub modulator 23 in the energized state. The braking pressure is increased very rapidly during the second timed duration which starts at the time $t_4$. Then, when the braking pressure controlling signal is extinguished and the electromagnetic coil 24 is deenergized, the increasing rate of the braking pressure is stepped down and the braking pressure increases slowly. By changing the braking pressure in the manner described above, the braking operation can be controlled to suit all the road surface conditions encountered regardless of the coefficients of friction involved, and after the extinction of the braking pressure release signal the increasing rate of the braking pressure can be adjusted to match the road surface conditions. In place of the G sensor 11 which functions as correcting means for increasing the duration of the timing signal produced in the timer circuit 13 when the coefficient of friction between the wheel and the road surface is large, release signal detecting means may be used which detects the duration of a braking pressure release signal, and increases said duration if said duration is too short. Instead of the combination of the timer circuit 13 which produces timing signals sustainable for varying durations and the correcting means, there may be used a combination of a timer circuit which products timing signals sustainable for a single predetermined duration and a differentiation circuit which detects the zero or its vicinity of the differentiated value of the wheel speed and cuts an output signal from the timer circuit off at the instant of said detection, so that the same effects as the embodiment described above can be achieved. And in place of the correcting means which changes the duration of the timing signal, there may be correcting means which changes the braking pressure increasing rate in accordance with the changes of the road surface conditions as long as an output signal is present in timer circuit which operates in synchronism with the extinction of a release signal and produces a timing signal sustainable for a predetermined duration, so that the same effects as the embodiment described above can be achieved. The present invention can be embodied in any antiskid control device other than the embodiment described above such as an antiskid control device employing the differentiation of the wheel speed. The antiskid control device of the embodiment described above may include limiting which limits the changes of the braking pressure used in the antiskid control device when the vehicle body speed decreases to a value less than the predetermined value. If this limiting means is employed, it is possible to prevent erroneous operations due to the noise accompanying the detection of the wheel speed when the vehicle body speed is low. Further, means for changing the braking pressure decreasing rate which serves as braking pressure changing means may be used in addition to the braking pressure increasing rate changing means which changes the increasing rate of the braking pressure.

As has been described in the foregoing, the antiskid control device for vehicles an accordance with the present invention comprises a timer circuit for producing a timing signal in synchronism with the extinction of a release signal for preventing skidding, braking pressure increasing rate changing means for rapidly increasing the braking pressure applied to the wheel in response to said timing signal coming from the timer circuit, and correcting means for increasing the braking pressure increasing rate when a large amount of friction is present between the wheel and the road surface, and enjoys an outstanding advantage that it can hold the fluctuation of the braking pressure within a narrow range to prevent unnecessary vibrations of the vehicle at the time of braking thanks to the fact that the braking pressure increasing rate is changed when he braking pressure is reapplied to the wheel, and can control the braking operation at all times in a manner best suited to the various road surface conditions encountered so that a skid of the vehicle is prevented from occurring and the braking distance is reduced greatly, thanks to the fact that braking pressure increasing rate is adjusted in accordance with the coefficients of friction between the wheel and the road surface. In the antiskid control device for vehicles in accordance with the present invention, it is very easy to know a coefficient of friction between the wheel and the road surface by detecting the vehicle body speed, thanks to the use of the deceleration sensor functioning as correcting means which detects the vehicle body deceleration and increases the braking pressure increasing rate if the detected vehicle body deceleration value is large. Further in the present invention, since the duration of the timing signal is eliminated by employing the deceleration sensor, the braking pressure increasing rate can be adjusted by simply varying the time constant used in the timer circuit.

What we claim is:

1. An antiskid control device for vehicles comprising means for detecting the locking condition of a wheel upon braking to generate a release signal, means for releasing a braking pressure applied to said wheel in response to the release signal from said detecting means, a timer circuit for generating a timing signal having a predetermined time duration for the initial stage of the pressure reapplication of said braking pressure in synchronism with the time of said pressure reapplication in response to the extinction of the release signal from said detecting means, means for rapidly increasing the pressure reapplication rate of said braking pressure applied to said wheel for the initial stage of said pressure reapplication in response to the timing signal from said timer circuit, and correcting means for acting on said pressure reapplication rate increasing means to increase said pressure reapplication of said braking pressure when a large amount of friction is present between said wheel and the road surface, said correcting means including sensor means for detecting a vehicle body deceleration upon braking to act on said pressure reapplication rate increasing means to increase said pressure reapplication of said braking pressure when said vehicle body deceleration has a large value.

2. An antiskid control device for vehicles as defined in claim 1, wherein said sensor means generates a detecting signal when said vehicle body deceleration reaches a predetermined level to make said detecting signal increase the time duration of said timing signal fromm said timer circuit.

3. An antiskid control device for vehicles comprising:
means for detecting the locking condition of a wheel upon braking to generate a release signal,
a timer circuit for generating a timing signal having a predetermined time duration in synchronism with the extinction of the release signal from said detecting means,
braking pressure modulating means decreasing the braking pressure on the wheel in response to the release signal from said detecting means, and rapidly increasing the pressure reapplication rate of the braking pressure at the initial stage of the pressure reapplication in response to the timing signal emitted from said timer circuit upon extinction of the release signal, and
correcting means including sensor means for detecting a vehicle body deceleration upon braking and acting on said braking pressure modulating means to increase the pressure reapplication of the braking pressure when the vehicle body deceleration has a large value.

4. An antiskid control device for vehicles as defined in claim 3, wherein said sensor means generates, when the vehicle body deceleration reaches a predetermined level, a signal for increasing the time duration of the timing signal from said timer circuit.

5. An antiskid control device for vehicles as defined in claim 3, wherein said braking pressure modulating means includes a main modulator and a sub modulator, said main modulator decreasing the braking pressure in response to the release signal from said detecting means and reapplying the braking pressure upon extinction of the release signal, said sub modulator increasing the modulation rate of the braking pressure by said main modulator in response to the timing signal from said timer circuit.

6. An antiskid control device for vehicles as defined in claim 3, wherein said braking pressure modulating means modulates the braking pressure applied common to all wheels of the vehicles.

7. An antiskid control device for vehicles comprising
means for detecting the locking condition of a wheel upon braking to generate a release signal,
main modulator means decreasing a braking pressure on the wheel in response to the release signal from said detecting means and reapplying the braking pressure upon extinction of the release signal,
timer means for generating a timing signal of a predetermined time duration in synchronism with the extinction of the release signal from said detecting means,
sub modulator means controlling the rates of braking pressure decreasing and increasing by said main modulator means, and rapidly controlling for the initial time duration the reapplication of the braking pressure by said main modulator means in response to the timing signal from said timer means and correcting means for detecting a friction between the wheel and the road surface and increasing the rate of the braking pressure increasing by said main and sub modulator means when a large friction is detected, and wherein said correcting means includes sensor means for detecting a vehicle body deceleration upon braking to act on said main and sub modulator means to increase the pressure reapplication of the braking pressure when the vehicle body deceleration has a large value.

8. An antiskid control device for vehicles comprising:
means for detecting the locking condition of a wheel upon braking to generate a release signal,
main modulator means decreasing a braking pressure on the wheel in response to the release signal from said detecting means and reapplying the braking pressure upon extinction of the release signal,
pressure control means for rapidly increasing for a predetermined intial time duration the reapplication of the braking pressure by said main modulator means upon extinction of the release signal from said detecting means and for slowly increasing the same after the lapse of said initial time duration, and
correcting means including sensor means for detecting a vehicle body deceleration upon braking and acting on said main modulator means to increase the pressure reapplication of the braking pressure when the vehicle body deceleration has a large value.

* * * * *